Aug. 16, 1960     J. T. WORCESTER     2,948,980
COMMERCIAL SHRIMP NET
Filed Oct. 30, 1959     3 Sheets-Sheet 3
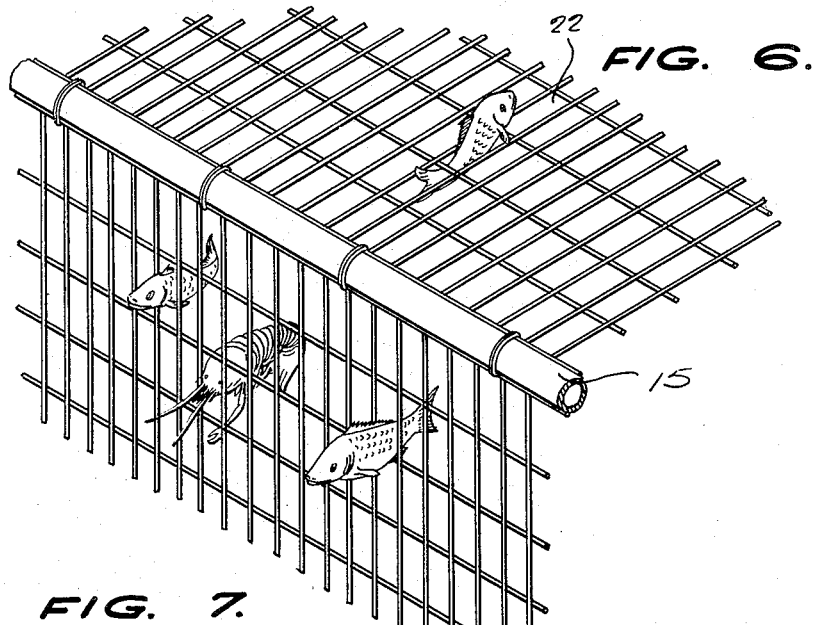
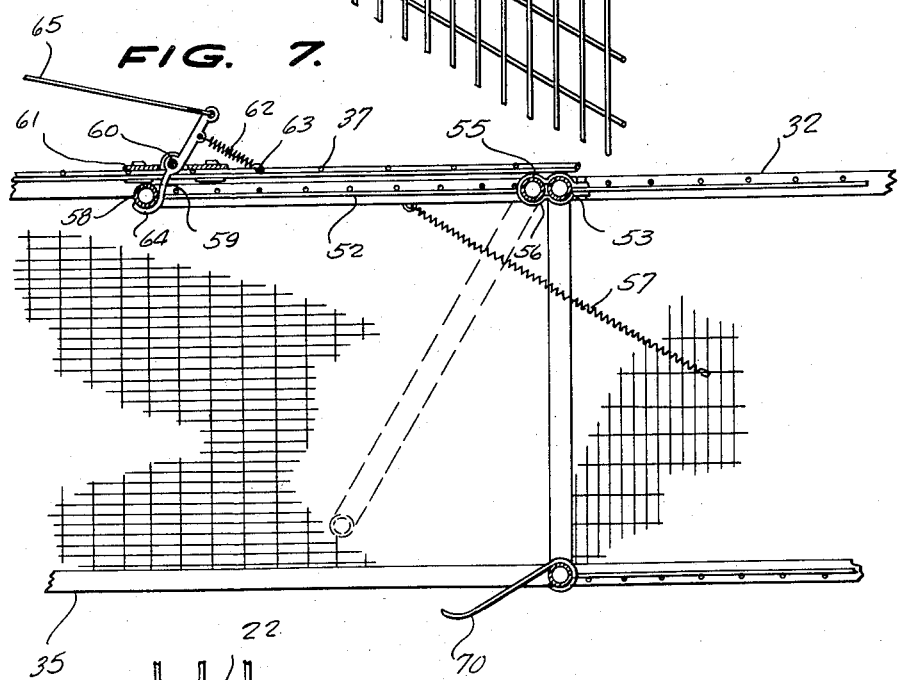
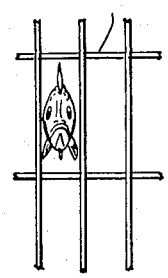
INVENTOR.
JOSEPH T. WORCESTER,
BY
McMorrow, Berman + Davidson
ATTORNEYS.

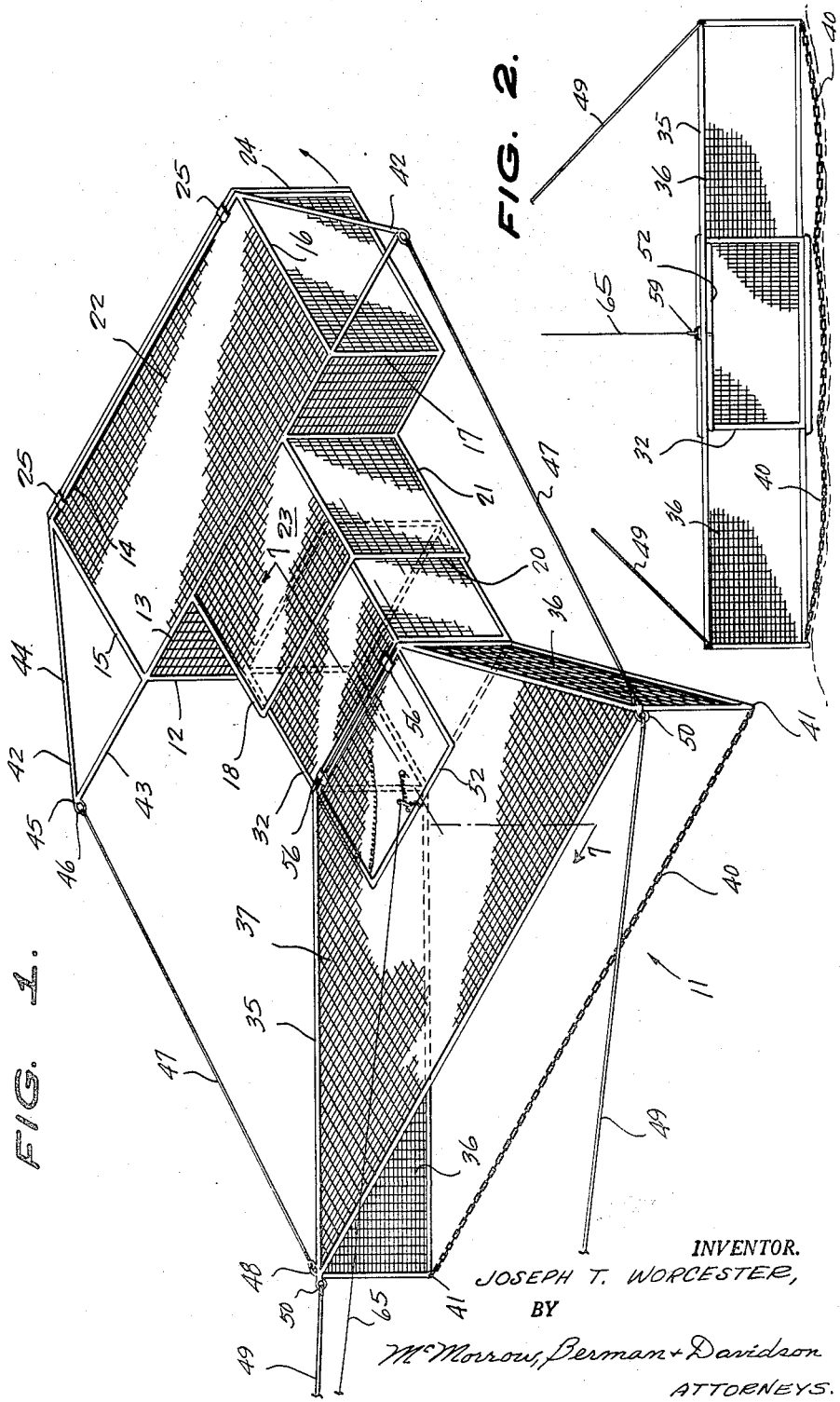

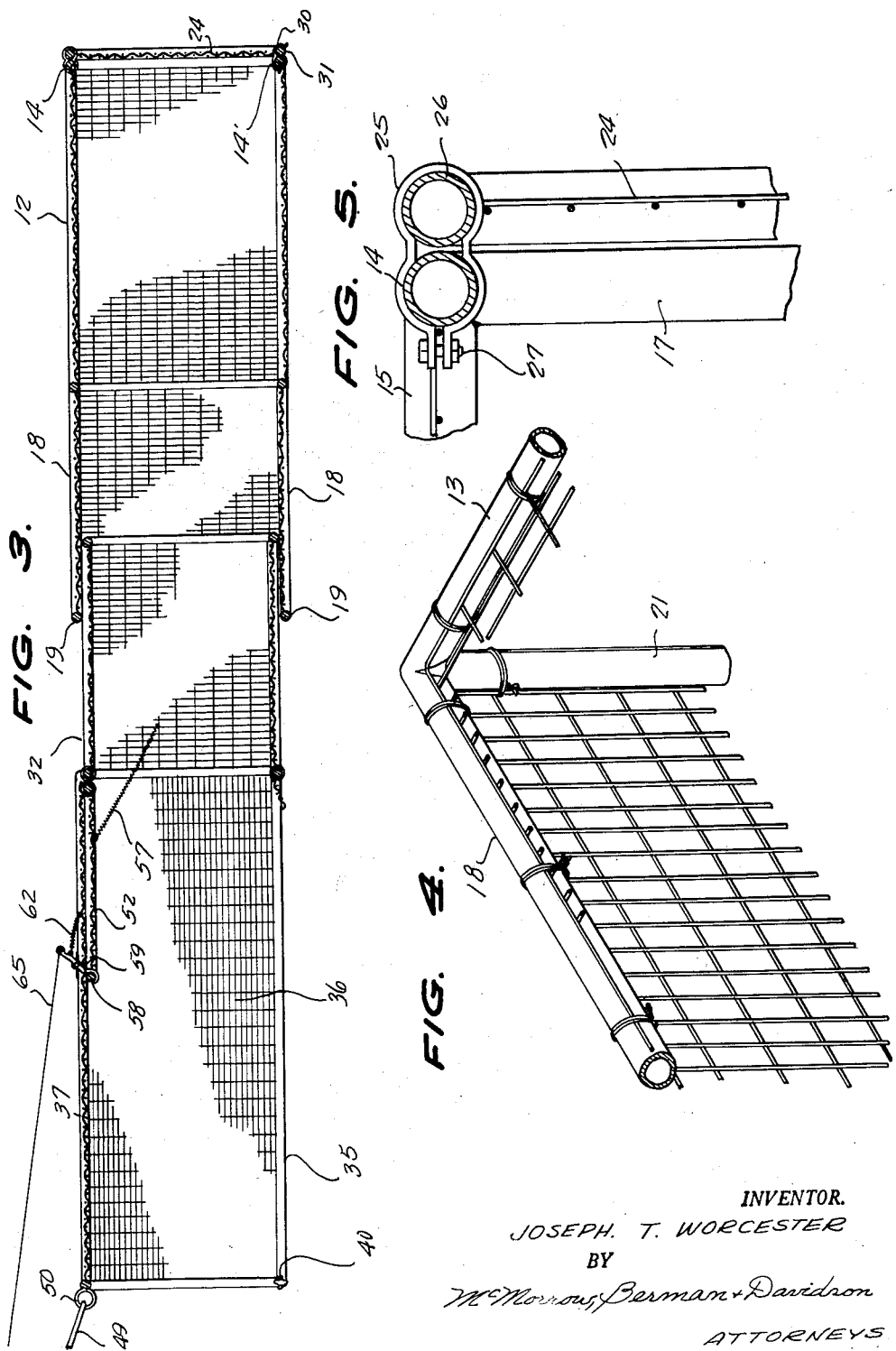

United States Patent Office 2,948,980
Patented Aug. 16, 1960

2,948,980
COMMERCIAL SHRIMP NET
Joseph T. Worcester, Box 351, Fairhope, Ala.
Filed Oct. 30, 1959, Ser. No. 849,774
6 Claims. (Cl. 43—9)

This invention relates to trawling devices, and more particularly to a trawling net particularly adapted to catch shrimp.

The main object of the invention is to provide a novel and improved shrimp trawling device which is relatively simple in construction, which is easy to use, and which is constructed so that small fish are allowed to readily escape therefrom while shrimp are retained therein.

A further object of the invention is to provide an improved shrimp trawling device which is relatively inexpensive to fabricate, which is durable in construction, which provides effective retention of shrimp therein but which allows small fish to escape therefrom, whereby the unnecessary capture of small fish is avoided, the device also being arranged so that undersized shrimp as well as small fish may readily escape therefrom, thus reducing the unnecessary destruction of the small shrimp as well as the small fish.

A still further object of the invention is to provide an improved shrimp trawling device which involves simple components, which is efficient in operation, which is arranged so that only shrimp above a predetermined size are caught and undersized shrimp and small fish are allowed to escape, which may be towed by the use of ordinary rope, which does not require the use of "otter boards," which requires a minimum amount of maintenance, and which is easy to unload.

Further objects and advantages of the invention will become apparent from the following description and claims, and from the accompanying drawings, wherein:

Figure 1 is a perspective view of an improved shrimp trawling device constructed in accordance with the present invention.

Figure 2 is a front elevational view of the trawling device shown in Figure 1.

Figure 3 is a vertical longitudinal cross sectional view taken through the shrimp trawling device of Figures 1 and 2.

Figure 4 is an enlarged fragmentary perspective view of a portion of the corner between one of the walls of the main receptacle of the shrimp trawling device of Figures 1 to 3 and the adjacent wall of the inlet duct communicating therewith.

Figure 5 is an enlarged vertical cross sectional view taken through the transverse hinged connection of the rear closure member to the transverse top end portion of the main receptacle of the shrimp trawling device of Figures 1 to 3.

Figure 6 is an enlarged perspective view showing a portion of the corner defined between the top wall and one of the vertical walls of the main receptacle of the shrimp trawling device of Figures 1 to 3, illustrating the elongated mesh structure of the receptacle, whereby small fish and undersized shrimp may readily escape from the receptacle.

Figure 7 is an enlarged fragmentary vertical cross sectional view taken substantially on the line 7—7 of Figure 1.

Figure 8 is a fragmentary elevational view showing a portion of one of the foraminous walls of the main enclosure of the shrimp trawling device, illustrating the elongated shape of the wire mesh apertures, whereby small fish may easily escape from the enclosure, whereas shrimp above a predetermined size will be retained therein.

Referring to the drawings, 11 generally designates an improved shrimp trawling device constructed in accordance with the present invention. The device 11 comprises a main receptacle 12 which is generally rectangular in shape and which comprises a rigid framework consisting of rigid metal tubular rods of suitable non-corrosive metal, such as aluminum, or the like, which are rigidly secured together to define a generally rectangular elongated box-like frame work illustrated in Figure 1. Thus, the framework comprises the transversely extending rods 13 and 14 connected by the longitudinal end rods 15 and 16, defining the top panel of the framework, and similar rods disposed parallel to the rods of the top panel to define the bottom panel, the top and bottom rods being connected at the corners of the framework by the vertical tubular rods 17.

At the intermediate portion of the front panel of the frame, an additional auxiliary framework is provided, comprising the forwardly extending tubular rods 18 connected at their forward ends by transverse rods 19, and being further connected by the vertical rods 20 and 21 to define a reduced auxiliary framework projecting forwardly from the main frame of the receptacle. The framework structure thus defined is covered by foraminous fesh material 22, thereby defining the main enclosure and an inlet conduit 23 communicating therewith.

The main enclosure 12 is provided with the pivoted rear closure flap 24, comprising a rectangular frame to which is secured a foraminous covering, similar to that employed for the remainder of the main enclosure 12. The rear cover member 24 is hingedly connected to the top transversely extending tubular rod member 14 by a pair of hinge loops 25, illustrated in Figure 5, which engage around the upper transversely extending frame elements 14 and 26, as shown in Figure 5, and which are secured at their ends by fastening bolts 27. Thus, the top transverse rod member 26 of the closure flap 24 is pivotally connected to the transverse top edge of the main enclosure and may be at times swung open to allow the contents of the main receptacle 12 to be discharged therefrom. A suitable latch hook 30 is pivoted to the transversely extending bottom rod at the bottom rear edge of the main receptacle, the hook being lockingly engageable over the transversely extending bottom rod 31 of the cover flap 24 to secure the cover flap in its closed position, shown in Figure 3. The latch hook 30 is pivotally engaged on the transverse bottom rod, shown at 14′ in Figure 3, so that the hook 30 may be readily disengaged from the transverse bottom rod of the cover member 24 to allow the cover member to be opened.

The foraminous material 22 is formed with elongated mesh openings, as shown in detail in Figure 8, so that small fish may readily escape from the enclosure, the mesh openings being narrow enough to prevent the escape of shrimp above a specified size. However, small fish, being of relatively flat shape, may readily pass between the more closely spaced wires of the mesh, as illustrated in Figure 8, due to the relatively small width of the fish.

The mesh material 22 may be arranged with the mesh openings running horizontally in certain walls of the main receptacle 12 and running vertically in certain other walls of said main receptacle, so that the small fish may easily find escape openings in either one wall or another of the main receptacle, thus insuring the escape of a relatively large number of such small fish caught in the device.

Telescopically engaged in the inlet duct 23 is an inlet conduit member 32, the conduit member 32 being constructed in the same manner as the receptacle 12, namely, comprising a rectangular framework having its outer walls covered with foraminous mesh material. Rigidly secured to and communicating with the rectangular inlet conduit member is a forwardly flaring intake conduit portion 35 which comprises the forwardly diverging foraminous side walls 36, 36 and the foraminous horizontal top wall 37, the member 35 being constructed similar to the other elements of the device previously described, namely, comprising a suitable rigid framework on which foraminous mesh material is secured, the mesh material having relatively elongated mesh openings.

Designated at 40 is a relatively heavy drag chain which is connected between the bottom forward corners 41, 41 of the forwardly flaring intake conduit portion 35, said chain serving as a means for scraping up the bottom as the trawling device is pulled forwardly, whereby to dislodge shrimp and to force the dislodged shrimp into the inlet conduit member 32 responsive to the forward movement of the device.

As is apparent from Figure 1, the bottom of the forwardly flaring intake conduit portion 35 is open, whereby to facilitate the entry of the dislodged shrimp into the inlet conduit member 32.

Projecting from the top end portions of the main receptacle 12 are the respective triangular bracket structures 42, 42, said bracket structure being rigidly fastened to the top panel of the framework associated with the main receptacle 12 and projecting horizontally therefrom in opposite lateral directions. Each bracket member 42 comprises a transversely extending forward rod portion 43 and an inclined rear rod portion 44, said rod portions being rigidly connected to the top corners of the framework of the receptacle 12 and being further rigidly connected at their outer ends, as shown at 45. The junctions 45 of the bracket members 42 are provided with respective eye members 46, and said eye members are connected by flexible cables 47 to corresponding eye members 48 secured to the top forward corner portions of the forwardly flaring intake conduit portion 35 of the device. The flexible conduit members 47, 47 limit forward extension of the slidable inlet conduit 32 with respect to the intake duct 18 in which the conduit 32 is telescopically received.

A pair of trawling cables 49, 49 are connected to respective additional eye loops 50, 50 provided at the top forward corner portions of the forwardly flaring inlet conduit member 35, whereby the device is connected to the trawling vessel and may be pulled forwardly thereby.

Designated at 52 is a hinged closure member which is provided at the forward end of the inlet conduit 32, the flap member 52 being hinged to the transversely extending top forward rod member 53 of the conduit 18 in the same manner as the rear closure flap 24 is hinged to the top transversely extending frame rod 14, previously described. The rectangular flap member 52 is thus swingable around the horizontal transverse axis defined by the transverse top frame rod 55 thereof, being hingedly held by hinge loops 56 similar to the hinge loop 25 previously described. A coiled spring 57 is connected between one side rod of the flap member 52 and the foraminous adjacent side wall of the conduit member 32, whereby to bias the flap 52 towards its vertical closed position. The flap member 52 may be held in a horizontal open position, such as that shown in Figure 7, by engaging its free transverse frame rod 58 with a pivoted detent lever 59 provided in the top panel 37 of the forwardly flaring member 35. The detent lever 59 is pivoted on a transverse pivot rod 60 mounted on a horizontal supporting plate 61 secured to the intermediate portion of the top foraminous mesh wall 37 of member 35, as shown in Figure 7, the lever 59 being biased in a clockwise direction, as viewed in Figure 7, by a coiled spring 62 connecting the upper portion of the lever to a rearwardly located transversely extending wire 63 forming part of the foraminous top wall 37 of member 35.

As shown in Figure 7, the lever 59 is provided with an arcuately curved forward detent portion 64 which is lockingly engageable with the transversely extending frame rod 58 of the closure flap 52, to support the closure flap in an open position, by the biasing action of the spring 62. A release cable 65 is connected to the top end of the lever 59, the cable leading to the trawling vessel, so that it may be manually pulled, as required, to release the closure flap 52. Thus, when it is deemed necessary to close off the forward end of the conduit member 32, as when a full catch has been obtained, the cable 65 may be pulled, releasing the closure flap 52 and allowing the spring 57 to move the flap to its vertical closed position.

To facilitate the forward movement of the device along the bottom as it is being pulled forwardly by the cables 49, 49, suitable skids or shoes 70 may be provided on the bottom portions of the device to facilitate sliding movement of the device along the ground.

In operation, the device is pulled forwardly along the bottom, the chain 40 acting to dislodge the shrimp, and the shrimp being forced into the receptacle through the telescoping conduit elements 32 and 23. Small fish and undersized shrimp are allowed to escape from the receptacle, because of the elongated shape of the mesh apertures, as above described. The shrimp above a predetermined limiting size are retained within the receptacle. Because of the telescoping cooperation between the conduit member 23 and the inlet conduit 32, the device may contract or elongate in accordance with the irregularities of the bottom over which the device is pulled, but the conduit member 32 cannot disengage from the element 23 because the cables 47, 47 limit the forward extension of conduit member 32 with respect to the main receptacle.

After a sufficient catch has been obtained, the closure flap 37 may be released by pulling the release cable 65, allowing the flap 37 to be swung to its vertical closed position by its associated biasing spring 57.

The drag chain 40 is of substantial weight and pulls the device down so that it is held adjacent the ground, the chain 40 acting as an agitating means to dislodge the shrimp as the device is pulled forwardly along the bottom.

As above mentioned, the framework of the various portions of the device is made of suitable corrosion-resistant metal, and similarly, the foraminous material employed to cover the framework is likewise made of suitable corrosion-resistant wire mesh material.

As above explained, the foraminous mesh material employed in the device is provided with relatively elongated mesh apertures to allow relatively small fish and undersized shrimp to escape from the device. This feature prevents unnecessary destruction of the small fish and the undersized shrimp and thus results in ultimate conservation of fish and shrimp to promote the continuing future availability of fish and shrimp for future collection. Furthermore, the undersized fish and shrimp have very little commercial value and merely represent an expenditure of time and labor in collecting and handling same. The device of the present invention allows a relatively large proportion of the undersized fish and shrimp to escape, thus reducing waste and unnecessary destruction of these creatures.

While a specific embodiment of an improved shrimp trawling device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A shrimp trawling device comprising a main receptacle including a rigid framework and foraminous mesh material covering said framework and defining an enclosure, said mesh material being constructed and arranged to define relatively elongated apertures therein of sufficient size to allow the passage of small fish therethrough, an inlet duct communicating with one wall of said main receptacle, an inlet conduit member telescopically received in said inlet duct, a forwardly flaring intake conduit connected to the forward end of said inlet conduit member, means limiting forward extension of said intake conduit with respect to the main receptacle, and a flexible drag member secured transversely across the bottom portion of the forward end of said intake conduit.

2. A shrimp trawling device comprising a main receptacle including a rigid framework and foraminous mesh material covering said framework and defining an enclosure, said mesh material being constructed and arranged to define relatively elongated apertures therein of sufficient size to allow the passage of small fish therethrough, an inlet duct communicating with one wall of said main receptacle, an inlet conduit member telescopically received in said inlet duct, a forwardly flaring intake conduit connected to the forward end of said inlet conduit member, means limiting forward extension of said intake conduit with respect to the main receptacle, said intake conduit being open at its bottom end, and a drag chain secured transversely across the bottom portion of the forward end of said intake conduit.

3. A shrimp trawling device comprising a main receptacle including a rigid framework and foraminous mesh material covering said framework and defining an enclosure, said mesh material being constructed and arranged to define relatively elongated apertures therein of sufficient size to allow the passage of small fish therebrough, respective rigid bracket member projecting from the opposite sides of said main receptacle, an inlet duct communicating with one wall of said main receptacle, an inlet conduit member telescopically received in said inlet duct, a forwardly flaring intake conduit connected to the forward end of said inlet conduit member, respective flexible cable members connecting said bracket members to the side portions of said intake conduit and limiting forward extension of said intake conduit with respect to the main receptacle, and a flexible drag member secured transversely across the bottom portion of the forward end of said intake conduit.

4. A shrimp trawling device comprising a main receptacle including a rigid framework and foraminous mesh material covering said framework and defining an enclosure, said mesh material being constructed and arranged to define relatively elongated apertures therein of sufficient size to allow the passage of small fish therethrough, respective rigid bracket members projecting from the opposite sides of said main receptacle, an inlet duct communicating with one wall of said main receptacle, an inlet conduit member telescopically received in said inlet duct, a forwardly flaring intake conduit connected to the forward end of said inlet conduit member, respective flexible cable members connecting said bracket members to the side portions of said intake conduit and limiting forward extension of said intake conduit with respect to the main receptacle, said intake conduit being open at its bottom end, and a drag chain secured transversely across the bottom portion of the forward end of said intake conduit.

5. A shrimp trawling device comprising a main receptacle including a rigid framework and foraminous mesh material covering said framework and defining an enclosure, said mesh material being constructed and arranged to define relatively elongated apertures therein of sufficient size to allow the passage of small fish therethrough, an inlet duct communicating with one wall of said main receptacle, an inlet conduit member telescopically received in said inlet duct, a forwardly flaring intake conduit connected to the forward end of said inlet conduit member, means limiting forward extension of said intake conduit with respect to the main receptacle, a cover flap hinged to the top edge of the forward end of said inlet conduit member, pivoted latch means on the intake conduit engageable with said flap to hold same in a substantially horizontal open position, a control cable connected to said latch means and extending forwardly therefrom, said cable being constructed and arranged to actuate the latch means to release the cover flap and allow it to close responsive to a pull on the cable, and a flexible drag member secured transversely across the bottom portion of the forward end of said intake conduit.

6. A shrimp trawling device comprising a main receptacle including a rigid framework and foraminous mesh material covering said framework and defining an enclosure, said mesh material being constructed and arranged to define relatively elongated apertures therein of sufficient size to allow the passage of relatively small fish therethrough, respective rigid bracket members projecting from the opposite sides of said main receptacle, an inlet duct communicating with one wall of said main receptacle, an inlet conduit member telescopically received in said inlet duct, a forwardly flaring intake conduit connected to the forward end of said inlet conduit member, a cover flap hinged to the top edge of the forward end of said inlet conduit member, pivoted latch means on the intake conduit engageable with said flap to hold same in a substantially horizontal open position, a control cable connected to said latch means and extending forwardly therefrom, said cable being constructed and arranged to actuate the latch means to release the cover flap and allow it to close responsive to a pull on the cable, respective flexible cable members connecting said bracket members to the side portions of said intake conduit and limiting forward extension of said intake conduit with respect to the main receptacle, said intake conduit being open at its bottom end, and a drag chain secured transversely across the bottom portion of the forward end of said intake conduit.

References Cited in the file of this patent

UNITED STATES PATENTS

| | | |
|---|---|---|
| 1,486,390 | Pedersen | Mar. 11, 1924 |
| 2,413,552 | Ethridge | Dec. 31, 1946 |